(12) United States Patent
Bose et al.

(10) Patent No.: US 11,755,610 B2
(45) Date of Patent: *Sep. 12, 2023

(54) SYSTEMS AND METHODS FOR AUTOMATED DATA MIGRATION

(71) Applicant: Cigna Intellectual Property, Inc., Wilmington, DE (US)

(72) Inventors: Saktheeswaran Bose, Franklin, TN (US); Manickavasagam Kumar, Franklin, TN (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,504

(22) Filed: Oct. 31, 2022

(65) Prior Publication Data

US 2023/0052786 A1 Feb. 16, 2023

Related U.S. Application Data

(63) Continuation of application No. 16/998,020, filed on Aug. 20, 2020, now Pat. No. 11,487,777.

(51) Int. Cl.
*G06F 16/25* (2019.01)
*G06F 16/2455* (2019.01)
*G06F 16/23* (2019.01)

(52) U.S. Cl.
CPC ........ *G06F 16/254* (2019.01); *G06F 16/2379* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 5,758,150 A * | 5/1998 | Bell | G06F 16/27 |
| 8,479,158 B2 | 7/2013 | Chen | |
| 8,769,487 B2 | 7/2014 | Chandrasekharan | |
| 8,954,416 B2 | 2/2015 | Tuttle | |
| 9,659,054 B2 | 5/2017 | Mescal | |
| 10,223,434 B2 | 3/2019 | Milne | |
| 10,318,387 B1 * | 6/2019 | Chopra | G06F 11/1435 |
| 10,726,004 B2 | 7/2020 | Vanderpool | |
| 2012/0265726 A1 | 10/2012 | Padmanabhan | |
| 2017/0046199 A1 | 2/2017 | Kramer | |

(Continued)

*Primary Examiner* — Richard L Bowen
(74) *Attorney, Agent, or Firm* — Husch Blackwell LLP (57) ABSTRACT

A data movement system is provided for moving data using a data-to-file-to-data movement path. The data movement system includes a source database, a target database, a configuration database, and a data movement server. The data movement is in communication with the source database, the target database, and the configuration database. The processor is configured to receive a configuration record including source details and target details. The processor is also configured to define an extraction query based on the source details and to apply the extraction query to the source database to obtain an extraction load. The processor is further configured to generate a load file based on the extraction load, to define a load script based on the target details, and to apply the load script to the load file to obtain a load query. The processor is also configured to update the target database with the load query.

20 Claims, 4 Drawing Sheets (56) References Cited

U.S. PATENT DOCUMENTS

| | | |
|---|---|---|
| 2017/0206547 A1 | 7/2017 | Vise |
| 2018/0218052 A1 | 8/2018 | Cosgrove, Jr. |
| 2018/0292573 A1* | 10/2018 | Cecelski ................. G01W 1/10 |
| 2019/0102411 A1 | 4/2019 | Hung |
| 2019/0370348 A1 | 12/2019 | Beyer |
| 2019/0370352 A1 | 12/2019 | Duncan-Wilson |

* cited by examiner

SYSTEMS AND METHODS FOR AUTOMATED DATA MIGRATION

CROSS REFERENCE TO RELATED APPLICATIONS

This application is a continuation of U.S. application Ser. No. 16/998,020, which was filed Aug. 20, 2020. The entire disclosure of said application is incorporated herein by reference.

FIELD OF INVENTION

The field relates to systems, methods, and architectures for automated end-to-end data movement using a file-to-data-to-file approach.

BACKGROUND OF THE DISCLOSURE

In many modern data centers, there is significant demand for tools to consolidate, move, and otherwise migrate large data sets (collectively "data migration") to support critical functions including data analytics, business intelligence, operational systems, financial systems, and other systems, along with creating data warehouses. In many examples, such data migration involves changing data structures and formats, including converting heterogeneous data structures to homogeneous data structures.

Known tools exist to facilitate such data migration. Most notably, classes of extract, load, and transfer ("ETL") tools are available for facilitating data migration. However, such known tools have significant deficiencies and drawbacks. Technically, known ETL tools consume significant system resources, limit access to databases during migration, and have difficulties handling data migration of very large data sets. Known ETL tools are also relatively inflexible and require significant training and human resources. Additionally, many known ETL tools are expensive in terms of finances, time, and overhead.

Accordingly, enhanced data migration tools are desired that overcome the known technical and other deficiencies of ETL tools. As such, systems and methods for enhanced automated end-to-end data migration, are desired.

BRIEF SUMMARY OF THE INVENTION

In one aspect, a data movement system is provided for moving data from a source database to a target database using a data-to-file-to-data movement path. The data movement system includes a source database, a target database, a configuration database, and a data movement server. The data movement server includes a processor and a memory. The data movement is in communication with the source database, the target database, and the configuration database. The processor is configured to receive a configuration record including source details and target details from the configuration database. The processor is also configured to define an extraction query based on the source details and to apply the extraction query to the source database to obtain an extraction load. The processor is further configured to generate a load file based on the extraction load, to define a load script based on the target details, and to apply the load script to the load file to obtain a load query. The processor is also configured to update the target database with the load query.

In another aspect, a method is provided for moving data from a source database to a target database using a data-to-file-to-data movement path. The method is implemented by a data movement server. The data movement server includes a processor and a memory. The data movement server is in communication with a source database, a target database, and a configuration database. The method includes receiving a configuration record from the configuration database. The configuration record includes source details and target details. The method also includes defining an extraction query based on the source details. The method further includes applying the extraction query to the source database to obtain an extraction load. The method also includes generating a load file based on the extraction load and defining a load script based on the target details. The method additionally includes applying the load script to the load file to obtain a load query and updating the target database with the load query.

In yet another aspect, a data movement server is provided for moving data from a source database to a target database using a data-to-file-to-data movement path. The data movement server includes a processor and a memory. The data movement server is in communication with the source database, the target database, and a configuration database. The processor is configured to receive a configuration record from the configuration database. The configuration record includes source details and target details. The processor is also configured to define an extraction query based on the source details and to apply the extraction query to the source database to obtain an extraction load. The processor is also configured to generate a load file based on the extraction load and to define a load script based on the target details. The processor is further configured to apply the load script to the load file to obtain a load query and to update the target database with the load query.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

In the drawings, reference numbers may be reused to identify similar and/or identical elements.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

As used herein, the term "data movement" or "data migration" refers to an approach to move data from a first location (a "source") to a second location (a "target"). In the example described herein, the systems and methods provide a data movement system for moving data from a source to an intermediary location to a target. In some examples, including known ETL systems (described below), data migration involves migration using a data-to-data transfer. Data-to-data migration is resource intensive and known ETL tools for data-to-data migration are expensive and require significant overhead. The proposed system utilizes a data-to-file-to-data movement path, where the intermediary location to store and contain a load file.

As used herein, the term "extract, transform, load" or "ETL" refers to an approach of extracting data from one or more data sources, transforming the data to a new context than that of the source, and loading the data into a new data target. Data extraction involves extracting data from homogeneous or heterogeneous sources. Data transformation processes data by data cleansing and transforming the cleansed data into a proper, homogenous storage format and structure for the purposes of querying and analysis. Data loading describes the insertion of data into the final target database such as an operational data store, a data mart, a data lake or a data warehouse.

As used herein, the term "data schema" (or "database schema") is the structure of a particular database described in a formal language supported by a database management system ("DBMS") used to implement the particular database. The term "schema" refers to the organization of data as a blueprint of how the database is constructed (divided into database tables in the case of relational databases). All constraints are expressible in the same formal language. A database can be considered a structure in realization of the database language.

In many modern data centers, there is a significant demand for tools to consolidate, move, and migrate large data sets (collectively "data migration") to support critical functions including data analytics, business intelligence, operational systems, financial systems, and other systems, along with creating data warehouses. In many examples, such data migration involves changing data structures and formats. Known solutions attempt to address these needs through the use of ETL tools, and particularly data-to-data ETL tools. The shortcomings of known tools are technological in nature as well as practical. From a technological perspective, the known ETL data-to-data migration tools require significant processing resources. Excess utilization of server processor time may reduce the availability of the database and other server applications and increase the resources required to invest in server infrastructure. Further, such tools often require interruptions in access to the databases used for data migration (i.e., the source and target database) while the ETL tool accesses the databases. For many services, making databases unavailable is a significant technical constraint that impacts the data center. In some cases, known ETL tools are simply unable to move or migrate data exceeding a certain size. For example, at least one known ETL tool cannot handle moving thousands of tables at one time. Further, the shortcomings of known ETL tools entail significant expenses in resources, time, and finances.

To overcome the known technological problems in data movement identified above, a data movement system is provided. The data movement system specifically solves these problems by providing a configuration-based data-to-file-to-data migration path that avoids the resource limitations and migration size limitations imposed by known ETL tools. The data movement system includes a data movement server that interacts with a metadata table in a configuration database to facilitate movement of data from a source database to an intermediary file (a load file) to a target database.

Accordingly, the proposed data movement system described herein addresses the shortcomings, including the technological problems, using technological solutions. In some examples, the data movement system described results in a dramatic decrease in resources required for data movement, while overcoming the technical limitations of known ETL tools that cannot handle large volume data movement. For example, in an example embodiment, the data movement system described yields a twenty-fold decrease in development effort and required no development effort to change the database schema of the target database or the source database. The data movement system described further reduces the development and quality assurance ("QA") resource effort required by 80%, as compared to known ETL tools. The data movement system described further allows for end-to-end automation of data movement with automated generation of device discovery layers ("DDL"), metadata, and testing. The data movement system described also provides approximately an eight-fold increase in processing speed as compared to known ETL tools. In one example, the data movement system described may move up to two hundred and fifty (250) tables simultaneously as compared to thirty (30) tables simultaneously using known ETL tools. Compared to known ETL tools, the data movement system described also requires relatively less technical skills from developers. The data movement system described also imposes relatively low overhead for restarting and maintenance. Finally, the data movement system has significantly greater capacity to handle large volume data movement in comparison to known ETL tools.

In the example embodiment, a data movement system is provided. The data movement system includes a source database, a target database, and a configuration database. The data movement system also includes a data movement server configured to perform the functions described herein and, more specifically, to move data from the source database to the target database using a configuration-driven approach. In such an approach, the configuration for the data movement is at least partially specified in a metadata table in the configuration database. The data movement server may facilitate integration of data from heterogeneous source databases (i.e., databases running distinct DBMSes) to any target database with any DBMS (i.e., DBMS that is the same as or distinct from those of the source database DBMS) to meet business needs in a data center. The data movement system (also referred to as a "Turbo Data Mover") may facilitate data movement from and to databases using any suitable DBMS including, for example, Oracle, IBM DB/2, Microsoft SQL Server, MySQL, Postgre SQL, Sybase, Informatica, and Teradata. The data movement system may also facilitate data movement from a file such as a flat file, provided that the file has structure that can be parsed. The data movement system allows data movement for a full data load (i.e., movement of all data in a source database to a target database) or an incremental data load (i.e., selective, partial movement of data from the source database to the target database).

In an example embodiment, the source, target, and configuration databases may be physically resident in distinct servers. In a second embodiment, the databases are resident within shared servers. In a third embodiment, some of the databases are co-resident within a shared server and some reside on a distinct server. The databases may be configured to utilize any suitable DBMS including, for example, Oracle, IBM DB/2, MySQL, and Microsoft SQL Server. The source database generally includes any suitable information used within a datacenter that may be moved or migrated. The target database may be any database desirable for movement or migration including, for example, a data warehouse or a data silo.

As the data movement server uses a "configuration-driven" approach, a configuration database is used to manage the data-to-file-to-data movement path. More specifically, the configuration database includes a metadata table that includes relevant data regarding the source database and the target database. As such, the metadata table includes necessary elements to identify moved data and to specify the parameters of the data movement. In an example embodiment, the metadata table may include the following elements: (1) a unique identifier, (2) an identifier for a source, (3) a path, name, or identifier for the source database server, (4) an identifier for a source database, (5) a name of a source table, (6) a name of filtered columns, (7) an identifier of a target, (8) a path, name, or identifier for the target database server, (9) an identifier for a target server database, (10) a file name for the load file, (11) a file path or location for the load file, (12) a maximum refresh date, (13) a near real-time data flag, (14) an execution table group, (15) an extraction log, (16) a load log, (17) a near real-time source server identifier, (18) a near real-time source database name, (19) an active flag indicating whether a given table is active or inactive, (20) a extract load table flag indicating the movement status of a particular table, (21) an identifier for a staging server, (22) a path, name, or identifier for the staging database server, (23) an identifier for a staging database, (24) a name of a staging table, and (25) a source data key (i.e., a unique data key).

In several examples, the data movement server also creates log files, log records, and uses an audit balance control ("ABC") table to record the process and identify discrepancies or exceptions. The system uses these steps to provide integrity in the data movement and to notify or alert when exceptions or discrepancies are detected in the logs or audit records. The ABC table is used to provide auditing for the data-to-file-to-data movement path. In one example, the data movement server uses a process audit and exception notification model for data audit purposes. In such an example, the data movement server reports an exception when the audit records report an exception including, for example, a discrepancy in the row count of moved rows as compared to the row count of the source or target tables. In an example embodiment, the ABC table may include the following elements: (1) a unique identifier, (2) a mapping identifier to map the ABC record to the metadata table, (3) a start date of the data movement, (4) an end date of the data movement, (5) a row count for the total amount of rows moved, (6) a load type describing the type of data movement, (7) a load status describing the status of the data movement, and (8) a status flag. The log files and records are used to record the status and results of each step of the data movement.

The data movement server is configured to coordinate and perform the data movement described. More specifically, the data movement server interacts with the metadata table which defines the data movement path and the data movement performs such movement. The data movement server performs at least two distinct steps in the data movement path: (1) extraction; and (2) load. In an example embodiment, the data movement server performs the steps in succession, performing the extraction step followed by the load step. The data movement server is initiated to perform steps based on one of several triggering events prompting one or both steps: (1) a script, (2) an automated scheduler, (3) a command line interface, (4) a graphical user interface, (5) an application programming interface request, and (5) a user request.

In at least some examples, a script is executed to cause the data movement server is to perform one or both stages of the data-to-file-to-data movement. Specifically, execution of a script causes the data movement server to perform a data extraction function, a data loading function, or both. The script may be written using any suitable scripting language including, for example, PowerShell. In another example, ActiveBatch is used to schedule the data movement server. In the example embodiment, an extraction script requires parameters for a source server name and a source database name and, upon execution, triggers the extraction step. Likewise, a loading script requires parameters for a target server name and a target database name and, upon execution, triggers the loading step. Invocation of a combined script requires parameters for a source server name, a source database name, a target server name, and a target database name. Upon execution, the combined script performs the extraction step followed by the loading step. In other examples, the data movement server is initiated using other approaches, as noted above.

Once initiated, the data movement server receives a configuration record from the configuration database to perform the data-to-file-to-data movement. As described above and herein, the data-to-file-to-data movement may be referred to as "configuration-driven". In one example, the configuration record is contained within a metadata table of the configuration database. The configuration record includes source details and target details used to describe the parameters of the extraction step and loading step. In the example embodiment, the source details and target details include identifying information sufficient to identify the source table records and the target table. Specifically, the source details may include at least (1) an identifier for a source, (2) a path, name, or identifier for the source database server, (3) an identifier for a source database, and (4) a name of a source table. The source details may also include (1) a name of filtered columns, (2) a maximum refresh date, and (3) an execution table group. In the example embodiment, the source details and target details further specify an active flag (indicating whether a particular table is active and available to the data movement system) and a near real-time ("NRT") flag (indicating whether the table data requires near real-time data access). In other examples, the source details and target details may include any data from the metadata table including, for example, the elements specified above.

The data movement server defines an extraction query based on the source details. Specifically, the data movement server uses definitional data in the source details to identify the particular data sought to be extracted by the query. Where the source details have an inactive flag, the data movement server may ignore the data in the corresponding table (as indicated by the definitional data in the metadata table and source details) and overlooks it in creating the query. Where the source details have an active flag, the data movement server defines the query to extract the data in the corresponding table. The data movement server defines the extraction query to extract the data to provide NRT data availability upon loading. In an example embodiment, the query is written using a tool to export data from a source database. In one example, the query is written using a command line tool such as bulk copy program ("BCP") which is configured to write the queried data to an output file. In other examples, similar tools may be used including, for example, SQL*Loader for Oracle, load/export for DB/2, load data infile for MySQL, and copy for Postgre SQL.

The data movement server also applies the extraction query to the source database to obtain an extraction load. More specifically, the data movement server runs the extraction query which, as described, creates or generates a load file based on the extraction load. As noted above, the metadata table includes elements for (1) a file name for the load file, and (2) a file path or location for the load file. As such, the data movement server executes the query (using BCP or any suitable alternative), generates a load file, and writes the load file to the designated file path with the designated file name. After the file is written, the "extraction" step is concluded.

The data movement server is also configured to load the extracted data to perform the second step, the loading step. This step, like the extraction step, is configuration-driven. Accordingly, the data movement server defines a load script based on the target details. Like the source details, target details include sufficient information to define the loading process. In the example embodiment, the target elements include: (1) an identifier of a target, (2) a path, name, or identifier for the target database server, (3) an identifier for a target server database, and (4) a name for a target table. Further, in the example embodiment, the target details also include at least an active flag and an NRT flag. Where the target details have an active flag, the data movement server defines the query to load the data in the target table. The data movement server defines the load query to load the data to provide NRT data availability upon loading. The load query may be defined using any suitable database tool. In one example, a database utility tool such as FastLoad is used.

The data movement server is also configured to apply the load script to the load file to obtain a load query and to update the target database with the load query. More specifically, the data movement server runs the load query which, as described, updates or loads the target database using the load file. As noted above, the metadata table includes elements for (1) a file name for the load file, (2) a file path or location for the load file. The metadata table also includes elements for (1) an identifier of a target, (2) a path, name, or identifier for the target database server, (3) an identifier for a target server database, and (4) a name for a target table. As such, the data movement server executes the query (using FastLoad or any suitable alternative), generates a load file, and writes the load file to the designated file path with the designated file name. In some examples, the file name for the load file is standardized according to a default file name convention. In other examples, the file name is set by the user or the associated database systems. After the information from the load file is used to update the target database, the "load" step is concluded.

For ease of comprehension, the description above describes a single process of data movement from a table of a source database to a load file to a target database. In operation, the data movement server processes movement of multiple tables simultaneously, and allows movement of hundreds or thousands of tables simultaneously. In such examples, the data movement server processes multiple configuration records for multiple (hundreds or thousands) of tables, and performs the data movement for such tables. In at least some such examples, the data movement server is configured to logically define the extraction and loading process for enhanced performance. More specifically, the data movement server identifies a plurality of extracted elements associated with the source details. The elements correspond to each distinct table identified as active in the metadata table. The data movement server identifies a size associated with each extracted element, or, identifies the table size. The data movement server logically defines the extraction query as a plurality of extraction sub-queries defined based on the associated sizes of each extracted element. In other words, the data movement server logically groups the extraction query into a group of sub-queries (or jobs) to make retrieval more efficient and to allow for parallel querying of the source database. In other examples, the data movement server effects the same process for data loading by, for example, identifying the table size for each table identified in the target details. The data movement server logically defines the load query as a plurality of load sub-queries based on the associated sizes of each table identified for loading. The data movement server is also configured to apply the defined extraction sub-queries to update the target database in parallel processes.

In some examples, the data movement server is configured to update an ABC table used for auditing the data movement. In one example, upon initiating applying the extraction query, the data movement server is configured to update an audit table within the configuration database with an extraction start time. The data movement server is configured to update the audit table with an extraction end time upon completing applying the extraction query.

In another example, upon initiating the updating of the target database with the load query, the data movement server is configured to update an audit table within the configuration database with a load start time. The data movement server is also configured to update the audit table with a load end time upon completing the updating of the target database with the load query.

Throughout the data movement process, the data movement server is configured to update the ABC table. In addition to recording the start and end times of extraction and loading, the data movement server updates the row counts for the total amount of rows extracted from the source database table, the total amount of rows written in the load file, and the total amount of rows inserted (or updated) in the target database table, for each table. Each data movement process is associated in the ABC table with a unique identifier and a mapping identifier to map the ABC record to the metadata table. The data movement server also updates the ABC table with a load type describing the type of data movement (i.e., whether full or incremental), the load status (i.e., whether not started, pending, completed, interrupted, or reporting exception), and a status flag for the table (i.e., whether active or inactive). The data movement server is configured to scan the ABC table to identify exceptions including, for example, movement processes with inconsistent records for row counts, interruptions, or exceptions. Upon identifying such exceptions, the ABC table transmits an alert to a database server associated with a database administrator.

As described above, in some examples, the data movement server is configured to initiate the data movement process by executing a script. In some examples, the script is a command for performing either: (1) the extraction step, (2) the loading step, or (3) both. The script is executed with associated parameters. In one example, execution of the extraction step may require parameters identifying a source server and a source database. In another example, execution of the load step may require parameters identifying a target server and a target database. In a further example, execution of both steps may require parameters identifying a source server, a source database, a target server, and a target database. Finally, in some examples, the command may be run with a parameter indicating which step or steps of the data movement is commanded.

The data movement server may also use parameters for table groups during movement. As described above, each table may be associated with an execution table group identified in the metadata table. During execution of the commands, the data movement server may use the table group parameter to selectively move some tables (with an associated table group indicated in the parameter) and simplify the migration.

In some examples, the data movement server transmits an alert or other communication to an associated device when the process concludes or is terminated. In one example, when the process is successfully completed, fails, or is interrupted, the data movement server alerts or communicates with an associated device identifying the movement status and the associated timestamp and datestamp.

In some examples, the data movement server may move data from the source database to the target incrementally. In such examples, the source details and target details of the configuration database include a column specifying whether the data is to be moved incrementally or at once. In one example, the column takes a binary value such as a flag.

In the example embodiment, the data movement server automatically generates queries (such as the extraction and load queries) based on the metadata table without any further intervention from a user. Queries may be automatically generated for any suitable DBMS.

The data movement system described provides many advantages over known tools for data migration. In addition to the benefits identified above, the data movement system allows for better resource utilization and flexibility. For example, by shifting from data-to-data transfer, the databases may be only read once to effect data migration.

In the example embodiment, each source system is associated with a distinct configuration database and metadata table. Distinct metadata tables allows for customization of data movement for particular parts of the data center. In other examples, the source systems may utilize common metadata tables for simplicity.

As described above, the data movement system is configured to detect inconsistencies, errors, failures, and successes in data movement and to transmit alerts regarding the same. In some embodiments, the data movement system provides a dashboard for a user (such as a database administrator) to monitor data movement in the system.

Generally, the systems and methods described herein are configured to perform at least the following steps: receiving a configuration record, including a plurality of source details and a plurality of target details, from the configuration database; defining an extraction query based on the source details; applying the extraction query to the source database to obtain an extraction load; generating a load file based on the extraction load; defining a load script based on the target details; applying the load script to the load file to obtain a load query; updating the target database with the load query; identifying a plurality of extracted elements associated with the source details; identifying a size associated with each extracted element; logically defining the extraction query as a plurality of extraction sub-queries defined based on the associated sizes of each extracted element; applying the defined extraction sub-queries to update the target database in parallel processes; identifying a plurality of updated elements associated with the target details; identifying a size associated with each updated element; logically defining the load query as a plurality of load sub-queries defined based on the associated sizes of each updated element; applying the defined load sub-queries to obtain the extraction load and generate the load file in parallel processes; receiving the configuration record from a metadata table within the configuration table, wherein the configuration record further includes an active flag and a near real-time data flag associated with the source details and the target details; upon initiating the updating of the target database with the load query, updating an audit table within the configuration database with a load start time; upon completing the updating of the target database with the load query, updating the audit table with a load end time; upon initiating applying the extraction query, updating an audit table within the configuration database with an extraction start time; upon completing applying the extraction query, updating the audit table with an extraction end time; receiving source parameters identifying a source server and a source database; and generating the extraction query, in part, based on the source parameters.

Figure 1:
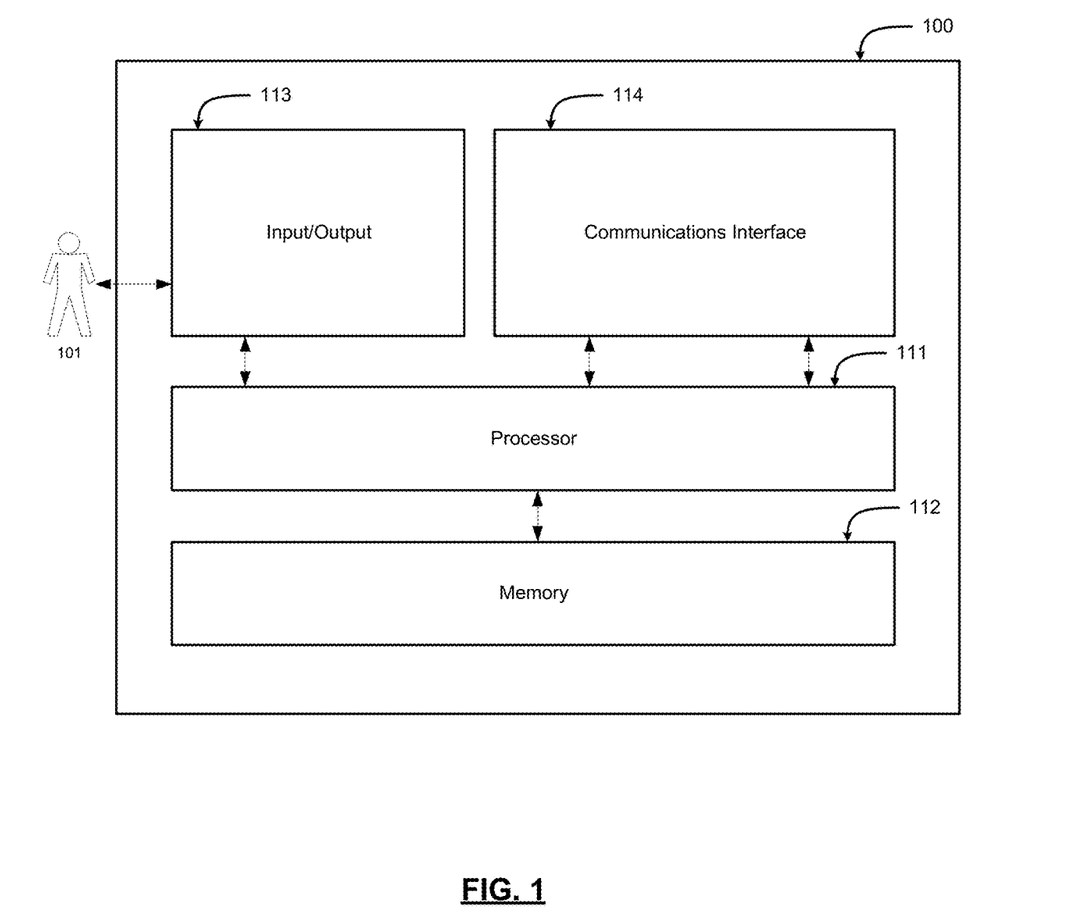
FIG. 1 is a functional block diagram of an example computing device that may be used in the data movement system described.
Figure 2:
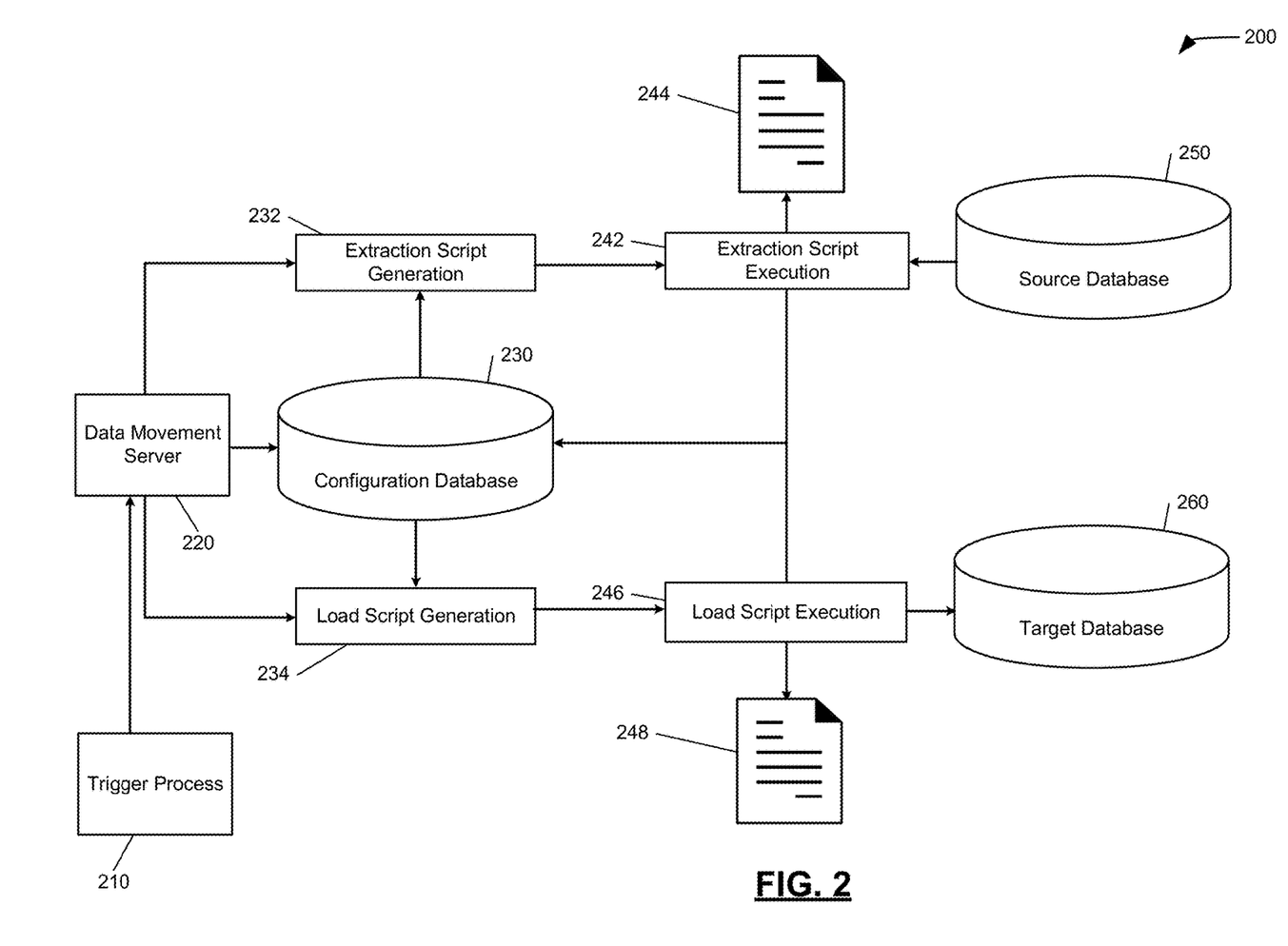
FIG. 2 is a functional block diagram of a data movement system that may be deployed using the computing devices shown in FIG. 1.

FIG. 1 is a functional block diagram of an example computing device that may be used in the data movement system described, and may represent the data movement server, the source database, the target database, and the configuration database (all shown in FIG. 2). Specifically, computing device 100 illustrates an exemplary configuration of a computing device for the systems shown herein, and particularly in FIG. 2. Computing device 100 illustrates an exemplary configuration of a computing device operated by a user 101 in accordance with one embodiment of the present invention. Computing device 100 may include, but is not limited to, the data movement server, the source database, the target database, and the configuration database (all shown in FIG. 2), other user systems, and other server systems. Computing device 100 may also include servers, desktops, laptops, mobile computing devices, stationary computing devices, computing peripheral devices, smart phones, wearable computing devices, medical computing devices, and vehicular computing devices. Alternatively, computing device 100 may be any computing device capable of the described methods for data-to-file-to-data movement from a source database to a target database. In some variations, the characteristics of the described components may be more or less advanced, primitive, or non-functional.

In the exemplary embodiment, computing device 100 includes a processor 111 for executing instructions. In some embodiments, executable instructions are stored in a memory area 112. Processor 111 may include one or more processing units, for example, a multi-core configuration. Memory area 112 is any device allowing information such as executable instructions and/or written works to be stored and received. Memory area 112 may include one or more computer readable media.

Computing device 100 also includes at least one input/output component 113 for receiving information from and providing information to user 101. In some examples, input/output component 113 may be of limited functionality or non-functional as in the case of some wearable computing devices. In other examples, input/output component 113 is any component capable of conveying information to or receiving information from user 101. In some embodiments, input/output component 113 includes an output adapter such as a video adapter and/or an audio adapter. Input/output component 113 may alternatively include an output device such as a display device, a liquid crystal display (LCD), organic light emitting diode (OLED) display, or "electronic ink" display, or an audio output device, a speaker or headphones. Input/output component 113 may also include any devices, modules, or structures for receiving input from user 101. Input/output component 113 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 113. Input/output component 113 may further include multiple sub-components for carrying out input and output functions.

Computing device 100 may also include a communications interface 114, which may be communicatively coupleable to a remote device such as a remote computing device, a remote server, or any other suitable system. Communication interface 114 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 114 is configured to allow computing device 100 to interface with any other computing device or network using an appropriate wireless or wired communications protocol such as, without limitation, BLUETOOTH®, Ethernet, or IEE 802.11. Communications interface 114 allows computing device 100 to communicate with any other computing devices with which it is in communication or connection.

FIG. 2 is a functional block diagram of a data movement system 200 that may be deployed using the computing device 100 (shown in FIG. 1). Data movement system 200 is process to illustrate the data-to-file-to-data process showed herein. Specifically, data movement system 200 includes components including data movement server 220, configuration database 230, source database 250, and target database 260. As described above, configuration database 230 includes a metadata table used to configure the data movement process.

In an example embodiment, a triggering process 210 prompts data movement server 220 to begin a data movement process. Triggering process 210 may be performed using, for example, a parameterized shell script, a batch scheduling process, a GUI or CLI command, or an API call from a third-party software. In the example embodiment, triggering process 210 specifies at least parameters to indicate (a) which steps of the process are requested, and (b) either (i) the location and identification of the source, source server database, source server database table, and/or (ii) the location and identification of the target, target server database, and target server database table.

The data movement server 220 processes the configuration records (including source details) received from the metadata table to generate an extraction script 232. In the example embodiment, the extraction script (or extraction query) 232 is generated using source details. The source details may include an active flag and a near real-time flag. The data movement server 220 executes 242 the extraction script 232. In operation, execution 242 of extraction script 232 represents running the script (e.g., a BCP query) on the source database to obtain tables or data from source database 250 as indicated in the metadata table. Data movement server 220 also writes a log file 244 and updates an audit balance control ("ABC") table stored at configuration database 230, based on the results of execution 242. Upon successful execution 242, data movement server writes a load file with a name and location specified in the metadata table. The load file includes information retrieved from source database 250 based on the parameters specified in metadata table and extraction script 232.

The data movement server 220 may also be triggered 210 to perform a loading process. The data movement server 220 processes the configuration records (including target details) received from the metadata table to generate a load script 234. In the example embodiment, the load script (or load query) 234 is generated using target details. The target details may include an active flag and a near real-time flag. The data movement server 220 executes 246 the load script 234. In operation, execution 246 of load script 234 represents running the script (e.g., a FastLoad query or in another embodiment a Multiload query is used) on the target database to insert or update tables or data from source database 250 into target database 260, as indicated in the metadata table. Data movement server 220 also writes a log file 248 and updates an audit balance control ("ABC") table stored at configuration database 230, based on the results of execution 246.

Figure 3:
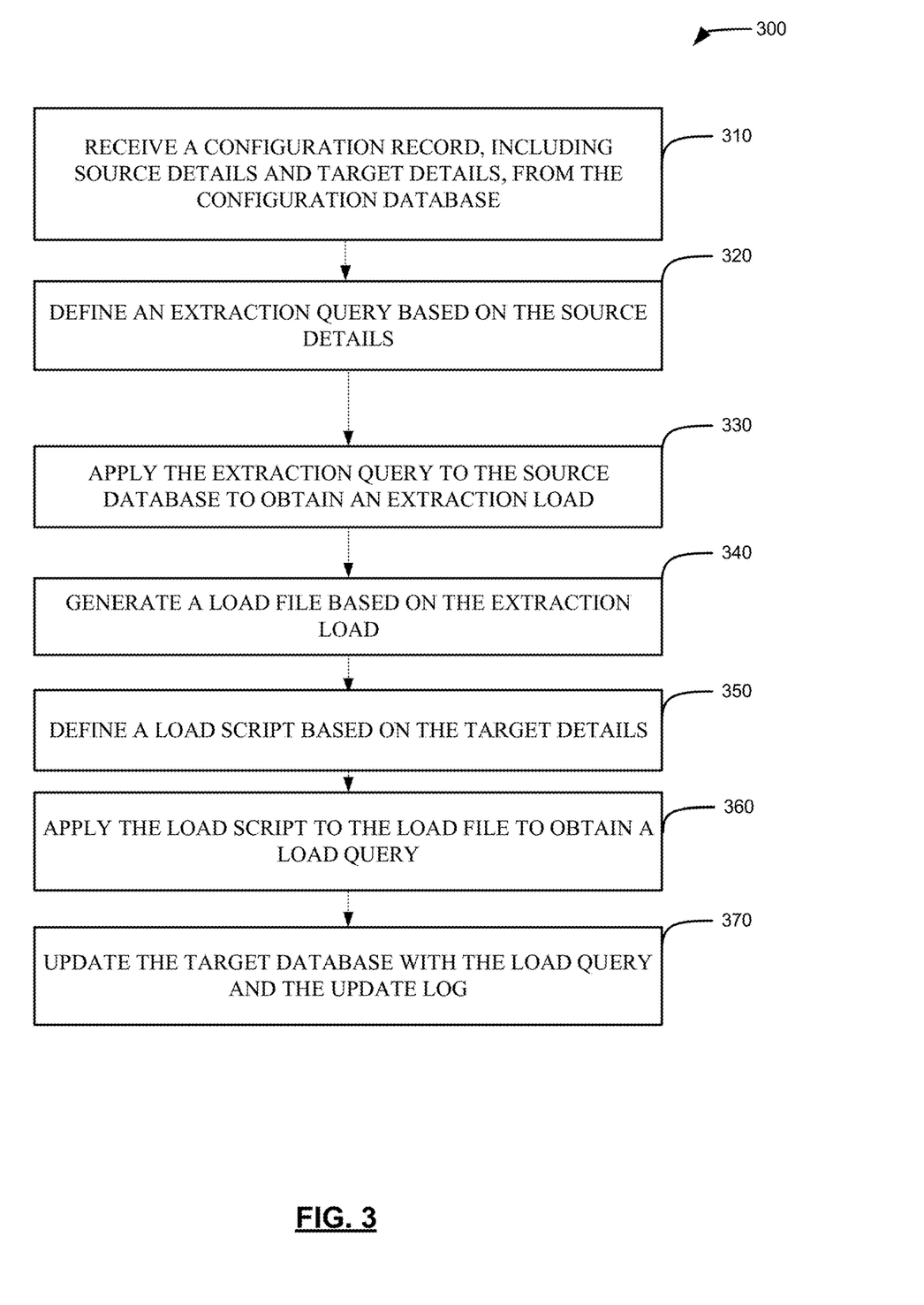
FIG. 3 is a flow diagram representing the data-to-file-to-data movement method from the perspective of the data movement server shown in FIG. 2.

FIG. 3 is a flow diagram representing the data-to-file-to-data movement method 300 from the perspective of the data movement server 220 (shown in FIG. 2). Data movement server 220 is configured to retrieve 310 a configuration record, including source details and target details, from the configuration database. In one example, the configuration record is contained within a metadata table of the configuration database. The configuration record includes source details and target details used to describe the parameters of the extraction step and loading step. In the example embodiment, the source details and target details include identifying information sufficient to identify the source table records and the target table. Specifically, the source details may include at least (1) an identifier for a source, (2) a path, name, or identifier for the source database server, (3) an identifier for a source database, and (4) a name of a source table. The source details may also include (1) a name of filtered columns, (2) a maximum refresh date, and (3) an execution table group. In the example embodiment, the source details and target details further specify an active flag (indicating whether a particular table is active and available to the data movement system) and a near real-time ("NRT") flag (indicating whether the table data requires near real-time data access). In other examples, the source details and target details may include any data from the metadata table including, for example, the elements specified above.

Data movement server 220 is also configured to define 320 an extraction query based on the source details. Specifically, data movement server 220 uses definitional data in the source details to identify the particular data sought to be extracted by the query. Where the source details have an inactive flag, the data movement server 220 may ignore the data in the corresponding table (as indicated by the definitional data in the metadata table and source details) and overlooks it in creating the query. Where the source details have an active flag, data movement server 220 defines the query to extract the data in the corresponding table. Data movement server 220 defines the extraction query to extract the data to provide NRT data availability upon loading. In an example embodiment, the query is written using a tool to export data from a source database. In one example, the query is written using a command line tool such as bulk copy program ("BCP") which is configured to write the queried data to an output file. In other examples, similar tools may be used including, for example, SQL*Loader for Oracle, load/export for DB/2, load data infile for MySQL, and copy for Postgre SQL.

Data movement server 220 is additionally configured to apply 330 the extraction query to the source database to obtain an extraction load. More specifically, data movement server 220 runs the extraction query which, as described, creates or generates a load file based on the extraction load. As noted above, the metadata table includes elements for (1) a file name for the load file, and (2) a file path or location for the load file. As such, data movement server 220 executes the query (using BCP or any suitable alternative), generates 340 a load file based on the extraction load, and writes the load file to the designated file path with the designated file name. The operation 340 can also update the ABC log. After the file is written, the "extraction" step is concluded.

Data movement server 220 is also configured to define 350 a load script based on the target details. Accordingly, data movement server 220 defines a load script based on the target details. Like the source details, target details include sufficient information to define the loading process. In the example embodiment, the target elements include: (1) an identifier of a target, (2) a path, name, or identifier for the target database server, (3) an identifier for a target server database, and (4) a name for a target table. Further, in the example embodiment, the target details also include at least an active flag and an NRT flag. Where the target details have an active flag, data movement server 220 defines the query to load the data in the target table. Data movement server 220 defines the load query to load the data to provide NRT data availability upon loading. The load query may be defined using any suitable database tool. In one example, a database utility tool such as FastLoad is used. In an example, a database utility tool such as MultiLoad is used.

Data movement server 220 is also configured to apply 360 the load script to the load file to obtain a load query and to update 370 the target database with the load query. More specifically, data movement server 220 performs the load query which, as described, updates or loads the target database using the load file. The operation update 370 can further write audit data to a log. In an example embodiment, the operation update 370 writes to the audit balance log and can include what is loaded and how many are loaded. As noted above, the metadata table includes elements for (1) a file name for the load file, (2) a file path or location for the load file. The metadata table also includes elements for (1) an identifier of a target, (2) a path, name, or identifier for the target database server, (3) an identifier for a target server database, and (4) a name for a target table. As such, data movement server 220 executes the query (using FastLoad or any suitable alternative), generates a load file, and writes the load file to the designated file path with the designated file name. In some examples, the file name for the load file is standardized according to a default file name convention. In other examples, the file name is set by the user or the associated database systems. After the information from the load file is used to update the target database, the "load" step is concluded.

Figure 4:
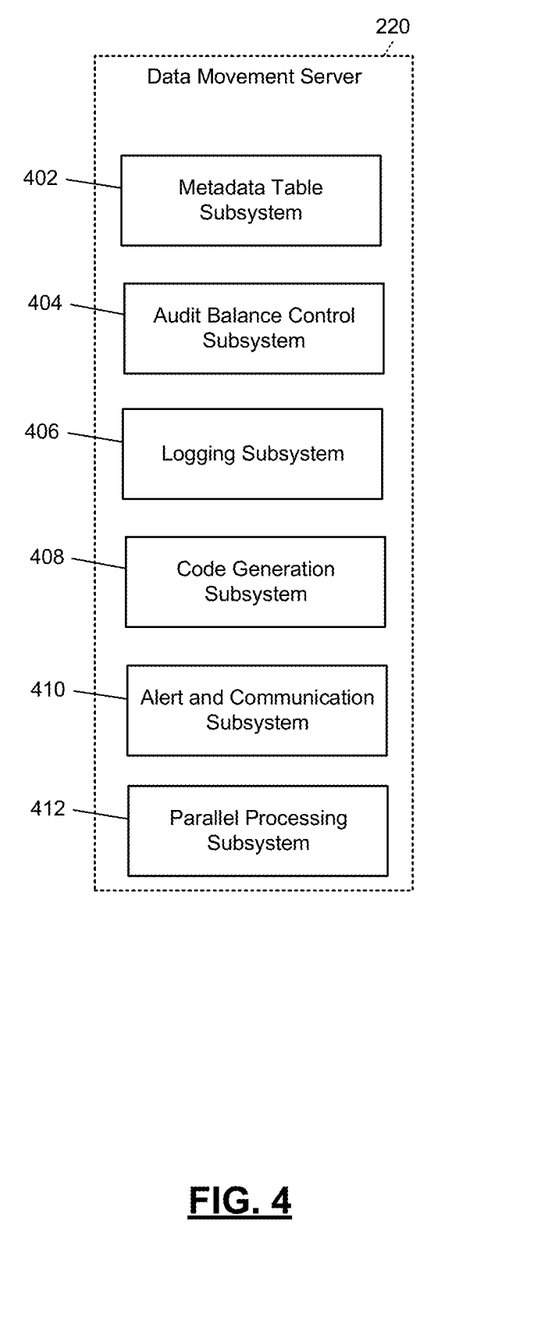
FIG. 4 is a diagram of elements of one or more example computing devices that may be used in the system shown in FIGS. 1 and 3.

FIG. 4 is a diagram of elements of one or more example computing devices that may be used in the system shown in FIGS. 1 and 3. Specifically, data movement server 220 includes a plurality of components 402, 404, 406, 408, 410, and 412 that may be used to perform the methods described herein. Data movement server 220 includes a metadata table subsystem 402 used to define and administer the metadata table of the configuration database. Specifically, metadata table subsystem 402 includes definitions and scripts for defining and administering the metadata table. Data movement server 220 includes an audit balance control ("ABC") table subsystem 404 used to define and administer the ABC table of the configuration database. Data movement server 220 includes a logging subsystem 406 used to write log files for extraction and loading, and to update log tables. Data movement server 220 includes a code generation subsystem 408 used to automatically generate code based on metadata tables for one or several DBMS systems. Data movement server 220 includes an alert and communication subsystem 410 used to send alerts and communications during the processing of the data movement server. Data movement server 220 includes a parallel processing subsystem 412 used to segment or group extract and load queries into sub-queries based on, for example, table size or execution group number.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:
1. A data movement system for moving data using a data-to-file-to-data movement path, comprising:
  a source database;
  a target database;
  a configuration database;
  a data movement server comprising a processor and a memory, the data movement server in communication with the source database, the target database, and the configuration database, the processor configured to:
  facilitate movement of data from the source database to an intermediary file, by:
    receiving a configuration record from a metadata table in the configuration database, including a plurality of source details and a plurality of target details;
    defining an extraction query based on the source details;
    applying the extraction query to the source database to obtain an extraction load as indicated in the metadata table, wherein the data comprises the extraction load; and
    generating a load file based on the extraction load, wherein the intermediary file comprises the load file;
    write the load file with a file name and file path specified in the metadata table; and
  facilitate movement of the data from the intermediary file to the target database, by:
    defining a load script based on the target details;
    applying the load script to the load file to obtain a load query; and running the load query to update the target database using the load file.

2. The data movement system of claim 1, wherein the processor is further configured to:
identify a plurality of extracted elements associated with the source details;
identify a size associated with each extracted element;
logically define the extraction query as a plurality of extraction sub-queries defined based on the sizes associated with each extracted element; and
apply the defined plurality of extraction sub-queries to update the target database in parallel processes.

3. The data movement system of claim 1, wherein the processor is further configured to:
identify a plurality of updated elements associated with the target details;
identify a size associated with each updated element;
logically define the load query as a plurality of load sub-queries defined based on the associated sizes of each updated element; and
apply the defined plurality of load sub-queries to obtain the extraction load and generate the load file in parallel processes.

4. The data movement system of claim 1, wherein the processor is further configured to:
receive the configuration record from the metadata table within a configuration table, wherein the configuration record further includes an active flag and a near real-time data flag associated with the source details and the target details, wherein the active flag is set to indicate when a particular table is active, and wherein the real-time data flag is set to indicate when the particular table requires near real-time access.

5. The data movement system of claim 1, wherein the processor is further configured to:
upon initiating updating of the target database with the load query, update an audit table within the configuration database with a load start time; and
upon completing the updating of the target database with the load query, update the audit table with a load end time.

6. The data movement system of claim 1, wherein the processor is further configured to:
upon initiating applying the extraction query, update an audit table within the configuration database with an extraction start time; and
upon completing applying the extraction query, update the audit table with an extraction end time.

7. The data movement system of claim 1, wherein the processor is further configured to:
receive source parameters identifying a source server and a source database; and
generate the extraction query, in part, based on the source parameters.

8. The data movement system of claim 1, wherein the processor is configured to define the extraction query to extract the data to provide near-real time data availability upon loading.

9. A method for moving data from a source database to a target database using a data-to-file-to-data movement path implemented by a data movement server, the data movement server including a processor and a memory, the data movement server in communication with a source database, a target database, and a configuration database, the method comprising:
facilitating movement of data from the source database to an intermediary file, by:

receiving a configuration record from a metadata table in the configuration database, including a plurality of source details and a plurality of target details;
defining an extraction query based on the source details;
applying the extraction query to the source database to obtain an extraction load as indicated in the metadata table, wherein the data comprises the extraction load; and
generating a load file based on the extraction load, wherein the intermediary file comprises the load file;
writing the load file with a file name and file path specified in the metadata table; and
facilitating movement of the data from the intermediary file to the target database, by:
defining a load script based on the target details;
applying the load script to the load file to obtain a load query; and
running the load query to update the target database using the load file.

10. The method of claim 9, further comprising:
identifying a plurality of extracted elements associated with the source details;
identifying a size associated with each extracted element;
logically defining the extraction query as a plurality of extraction sub-queries defined based on the associated sizes of each extracted element; and
applying the defined extraction sub-queries to update the target database in parallel processes.

11. The method of claim 9, further comprising:
identifying a plurality of updated elements associated with the target details;
identifying a size associated with each updated element;
logically defining the load query as a plurality of load sub-queries defined based on the associated sizes of each updated element; and
applying the defined load sub-queries to obtain the extraction load and generate the load file in parallel processes.

12. The method of claim 9, further comprising:
upon initiating updating of the target database with the load query, updating an audit table within the configuration database with a load start time; and
upon completing the updating of the target database with the load query, updating the audit table with a load end time.

13. The method of claim 9, further comprising:
upon initiating applying the extraction query, updating an audit table within the configuration database with an extraction start time; and
upon completing applying the extraction query, updating the audit table with an extraction end time.

14. The method of claim 9, further comprising:
receiving source parameters identifying a source server and a source database; and
generating the extraction query, in part, based on the source parameters.

15. A data movement server for moving data from a source database to a target database using a data-to-file-to-data movement path, the data movement server comprising a processor and a memory, the data movement server in communication with the source database, the target database, and a configuration database, the processor is configured to:
facilitate movement of data from the source database to an intermediary file, by:

receiving a configuration record from a metadata table in the configuration database, including a plurality of source details and a plurality of target details;

defining an extraction query based on the source details;

applying the extraction query to the source database to obtain an extraction load as indicated in the metadata table, wherein the data comprises the extraction load; and generating a load file based on the extraction load, wherein the intermediary file comprises the load file;

writing the load file with a file name and file path specified in the metadata table; and facilitate movement of the data from the intermediary file to the target database, by:
  defining a load script based on the target details;
  applying the load script to the load file to obtain a load query; and
  running the load query to update the target database using the load file.

16. The data movement server of claim 15, wherein the processor is further configured to:
  identify a plurality of extracted elements associated with the source details;
  identify a size associated with each extracted element;
  logically define the extraction query as a plurality of extraction sub-queries defined based on the associated sizes of each extracted element; and
  apply the defined extraction sub-queries to update the target database in parallel processes.

17. The data movement server of claim 15, wherein the processor is further configured to:
  identify a plurality of updated elements associated with the target details;
  identify a size associated with each updated element;
  logically define the load query as a plurality of load sub-queries defined based on the associated sizes of each updated element; and
  apply the defined load sub-queries to obtain the extraction load and generate the load file in parallel processes.

18. The data movement server of claim 15, wherein the processor is further configured to:
  upon initiating the updating of the target database with the load query, update an audit table within the configuration database with a load start time; and
  upon completing the updating of the target database with the load query, update the audit table with a load end time.

19. The data movement server of claim 15, wherein the processor is further configured to:
  define a metadata table to include a file name for the load file, a file path for the load file, an identifier of a target, an identifier for a target database server, an identifier for a target server database, and a target table name.

20. The data movement server of claim 15, wherein the processor is further configured to extract the data to provide near-real time data availability upon loading.

* * * * *